United States Patent
Asteggiano

(10) Patent No.: US 7,131,653 B2
(45) Date of Patent: Nov. 7, 2006

(54) STEERING DEVICE FOR THE SUPPORT DEVICE FOR THE REAR WHEEL HUB IN MOTOR-VEHICLES

(75) Inventor: Valter Asteggiano, Pocapaglia (IT)

(73) Assignee: C.R.F. Societa Consortile per Azioni, Orbassano (TO) (IT)

(*) Notice: Subject to any disclaimer, the term of this patent is extended or adjusted under 35 U.S.C. 154(b) by 76 days.

(21) Appl. No.: 10/687,390

(22) Filed: Oct. 15, 2003

(65) Prior Publication Data

US 2004/0135338 A1  Jul. 15, 2004

(30) Foreign Application Priority Data

Oct. 17, 2002  (IT) ................ TO2002A000903

(51) Int. Cl.
*B60G 3/14* (2006.01)
*B62D 7/06* (2006.01)
*B62D 5/04* (2006.01)

(52) U.S. Cl. ............... 280/124.128; 280/124.129; 280/93.502; 180/445

(58) Field of Classification Search ......... 280/124.128, 280/124.129, 124.13, 93.502, 93.504, 93.51, 280/124.153; 180/402, 445
See application file for complete search history.

(56) References Cited

U.S. PATENT DOCUMENTS

| | | | | |
|---|---|---|---|---|
| 3,674,285 A | * | 7/1972 | Grosseau | 280/124.153 |
| 5,380,024 A | * | 1/1995 | Hayami | 280/124.143 |
| 5,697,633 A | * | 12/1997 | Lee | 280/124.136 |
| 5,979,919 A | * | 11/1999 | Bruehl | 280/124.104 |
| 6,241,262 B1 | * | 6/2001 | Suess | 280/5.522 |
| 6,435,491 B1 | * | 8/2002 | Blondelet et al. | 267/279 |
| 2004/0007842 A1 | * | 1/2004 | Asteggiano | 280/124.1 |

FOREIGN PATENT DOCUMENTS

DE  38 36 255  4/1990

* cited by examiner

*Primary Examiner*—David R. Dunn
*Assistant Examiner*—George D. Spisich
(74) *Attorney, Agent, or Firm*—Merchant & Gould P.C.

(57) ABSTRACT

A support device for motor-vehicle wheel hubs adapted to be mounted between the hub and the body of the rear suspension, consisting of a connection element (12), rotatably connected to the body of the suspension and adapted to rotate on a plane which is basically perpendicular to the ground and parallel to the longer axis of the motor-vehicle, provided with attachments (15) for the hub (16) and connected to an elastic element (20), articulated on the body of the suspension (2, 3) and adapted to control its rotation.

4 Claims, 3 Drawing Sheets

STEERING DEVICE FOR THE SUPPORT DEVICE FOR THE REAR WHEEL HUB IN MOTOR-VEHICLES

The present invention refers to steering device for the support device for a rear wheel hub, that is a mechanical device that can be applied to a steering training-arm rear suspension in order to improve comfort for passengers, as well as stability. The rocking support device is intended to take up easily and economically the longitudinal impacts on the wheel of the motor-vehicle which are due to the impact of the wheel itself against upward projecting bumps on the road. Besides, the device is mounted on a support element provided with the steering lever and articulated at the end of the arm of the suspension, so that steering movements and longitudinal oscillations of the wheel in relationship to the arm itself can take place.

Nowadays rear suspensions of motor-vehicles, when of the wishbone type, generally consist of a longitudinal arm the ends of which are connected to the bodywork of the motor-vehicle and the wheel hubs of the wheel, respectively. The ends of the arm which are not connected to the wheel, are connected to the bodywork by means of bushes or bearings which are sometimes fixed to an intermediate structure called frame.

Such a rear suspension presents many advantages, including costs of production and reduced size, yet it implies some disadvantages such as the impossibility of steering and of being provided with good longitudinal flexibility, without altering the steering when subject to steering and/or braking load. It is in fact possible to say that current suspensions are generally characterised by higher and higher levels of longitudinal flexibility of the wheel in order to achieve better capacity to take up longitudinal impacts. This tendency has affected the design of suspensions determining, on the one side, as far as conventional schemes are concerned, more attention being paid to control during steering while the wheel is moving longitudinal, by means of increasing the geometrical constraints for the areas of attachments of the arms, and on the other, the definition of new types of suspensions adapted to control separately maneuverability and comfort. However, these suspensions are very expensive.

In the case of rocking-arm suspensions, it has become clear the impossibility of controlling maneuverability and comfort separately. The introduction of more flexible joint bushings on the bodywork in order to improve comfort, affects the maneuverability of the motor vehicle in the following aspects: a) divergence as a consequence of side loads; b) divergence as a consequence of asymmetrical longitudinal braking loads; c) divergence as a consequence of asymmetrical longitudinal load at wheel centre.

Besides, the addition of steering active controls even for the rear axles, requires that these can achieve steering angles of the important wheels of 6÷7 grades.

It is an object of the present invention to provide a device allowing certain clearance between the hub of the wheel and the body of the suspension, thus allowing mutual longitudinal displacement that prevents unwanted steering angles to occur when the wheel in question receives an impact.

The wheel itself can keep itself, according to what the driver wants, at steering angles which are controlled by the steering actuator itself, by means of the proper tension rod connect6ed to the lever located on the steering device. The object is achieved by means of the present invention providing a steering device intended to achieve the steering of a support for a rear wheel-hub of a rocking wheel of a motor vehicle presenting the characteristics of claim 1.

Additional advantages and characteristics will become clear from the following description, referring to the appended drawings provided as non-restrictive example and in which.

Figure 1:
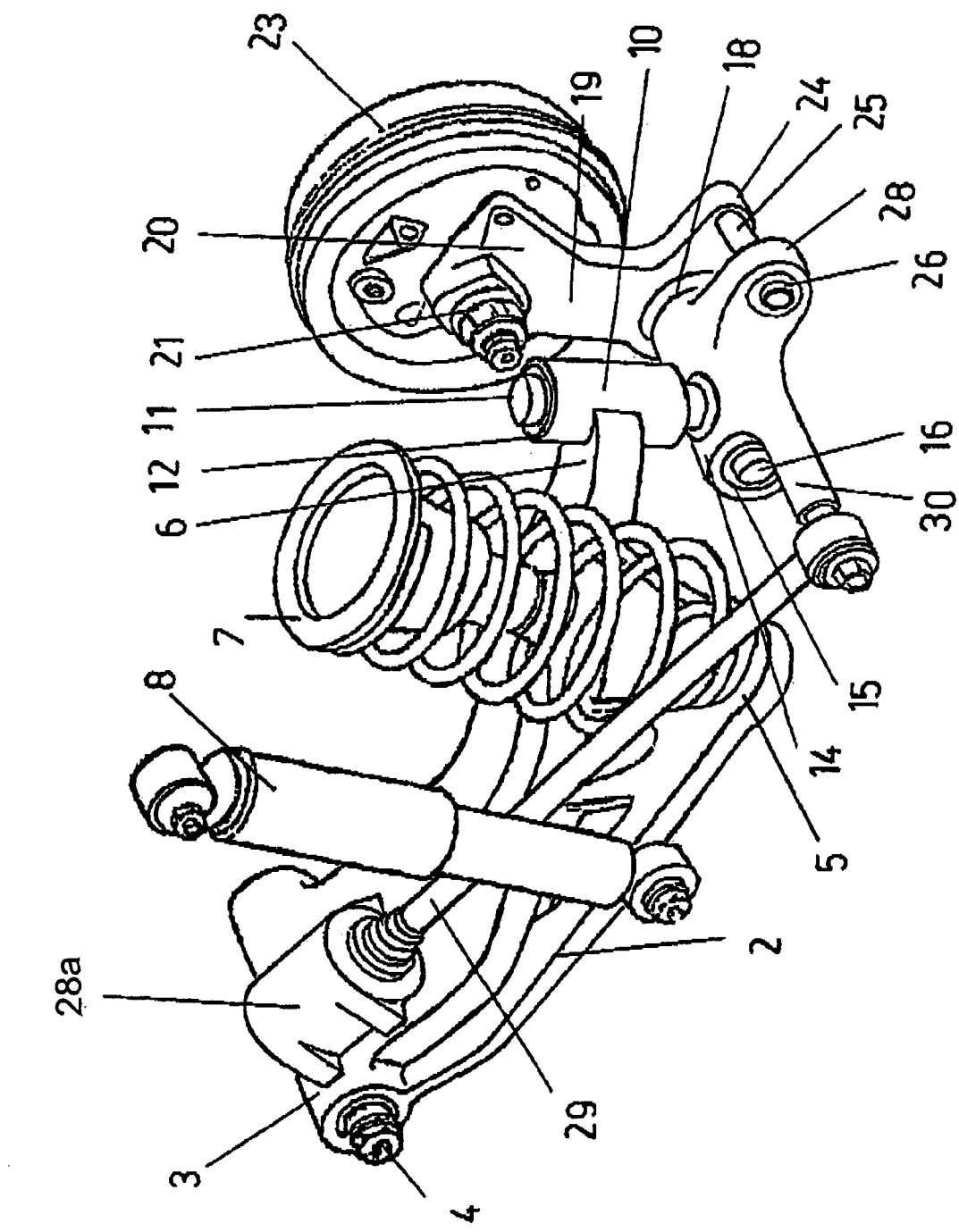
FIG. 1 is a schematic perspective view of a preferred embodiment of the device according to the invention, applied to a rear wishbone suspension.

With reference to the appended figures, and more in particular to FIG. 1, reference number 1 indicates the overall wishbone of a rear suspension for motor vehicles. One of the ends of the wishbone is connected to the bodywork of the motor-vehicle by means of a pivot 4. The other end of the wishbone 2 divides in two parts 5 and 6. The first one is provided with a spring 7, intended to support the bodywork of the motor-vehicle, and with a damper 8 intended to dampen the oscillations of the spring. The second part 6 is connected, by means of a tubular seat 10 in which an axle 11 rotates on bearing 12, to a cylindrical seat 14. The cylindrical seat, which is integral with the axle 11, is basically transversal to the arm 2 and perpendicular to the longitudinal axis of the motor-vehicle. In it at least a pair of bearings 15, adapted to rotatably support a pivot 16 fixed to them or otherwise connected, are housed.

According to the invention, pivot 16 is integral with a first point 18 of a connection element consisting of an elongated metal plate 19. A second point 20 of plate 19, which when used faces upwards in relationship to the arm 2 of the suspension, is provided with attachments 21 for a hub 23 of the wheel, which looks towards the external part of the motor-vehicle. A third point 24 of the metal plate 19 is connected, in the case shown, by means of a rigid axle 25 to a bushing 26 of predefined elasticity, being integral with a support 28 integral with the cylindrical seat 14.

According to the invention, the plate 19 will be able to oscillate forwards and backwards according to the direction the motor-vehicle is moving, around the axis determined by the pivot 16 inserted into the bearings 15. This oscillation that allows preventing the wheel from steering, will take place in a controlled way thanks to the elastic characteristic of the bushing 26 on which the plate 19 actuates through the axle 25 that behaves like an oscillating lever.

The rocking device thus realized guarantees that longitudinal loads due to the impact of the wheel with the upward projecting bumps of the road are absorbed. Besides, the whole rocking block, that is the hub of the wheel 23, the plate 19 and the cylindrical seat 14, either integral with each other or rotatably connected among them, is able to rotate around the axle defined by the pivot 16 supported by the bearings 12 inserted into the vertical seat 10 fixed to the wishbone 2. The steering is controlled by means of an actuator 28a, preferably an electric one, that moves tension rod 29 and makes a steering lever 30, fixed to or integral with the cylindrical seat 14, move.

Thus the conventional bushings of the suspension no longer control the longitudinal flexibility of the axle, and become radially rigid in order to nullify their effect on the divergence of the wheel and allowing their specialisation in controlling the stability of the motor vehicle. The device according to the invention highly improves comfort for passenger in case the overall contained weight is higher.

Figure 2:
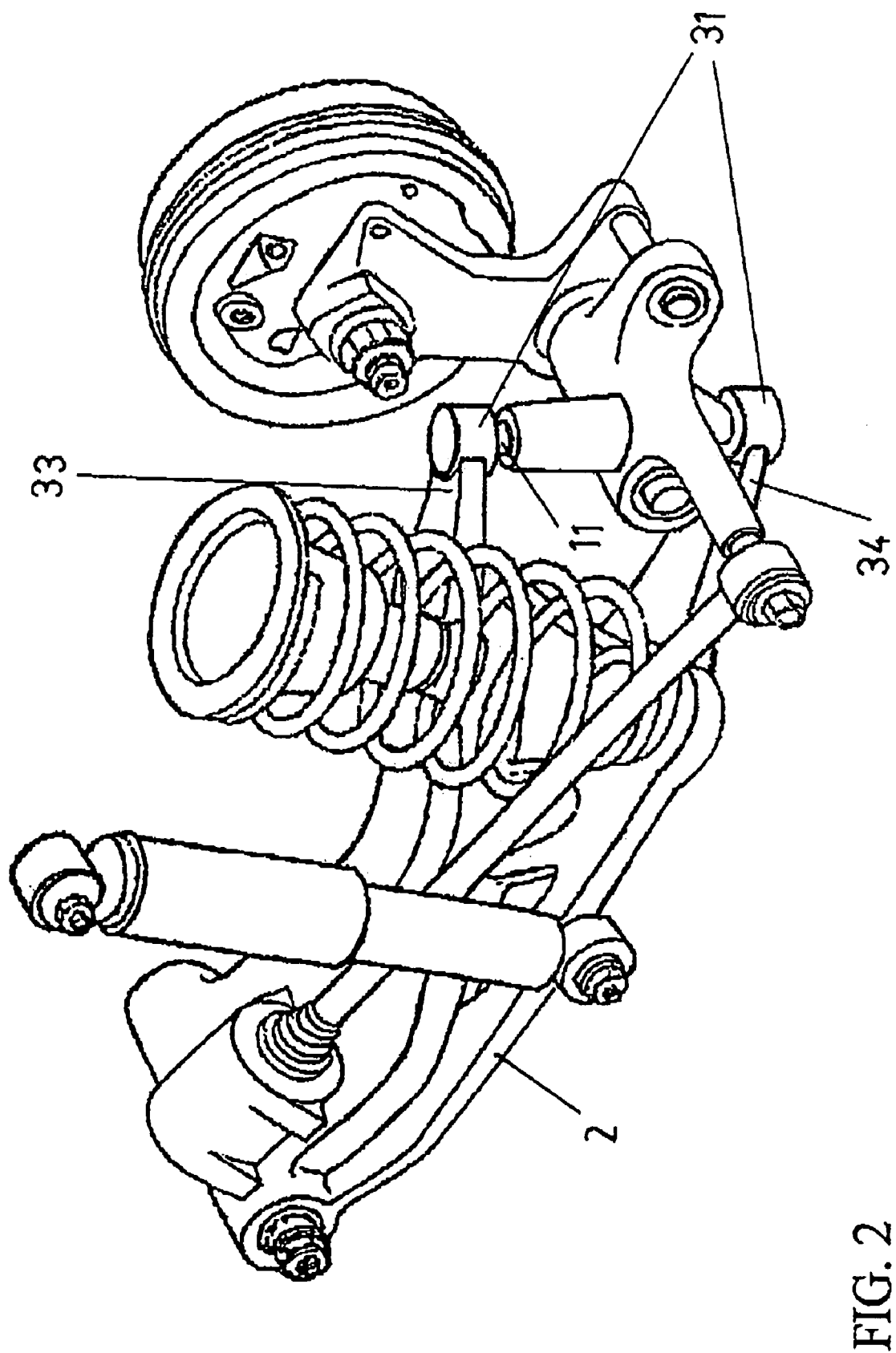
FIG. 2 is a schematic perspective view of another preferred embodiment of the device according to the invention where the axles of the steering of the wheel is defined by means of two articulations consisting of spherical joints connecting the two ends of the wishbone to the support element of the support rocking device for the wheel-hub.

FIG. 2 shows an alternative embodiment of the device according to the invention in which the axle 11, on which the entire rocking block of the wheel, that is the wheel-hub 23, the plate 19 and the cylindrical seat 14 rotates, is supported by means of two articulations consisting of spherical joints 31. The joints connect the wishbone 2, that divides in two ends 33 and 34, to the cylindrical seat 14 by means of the axle 11 that passes through it.

Figure 3:
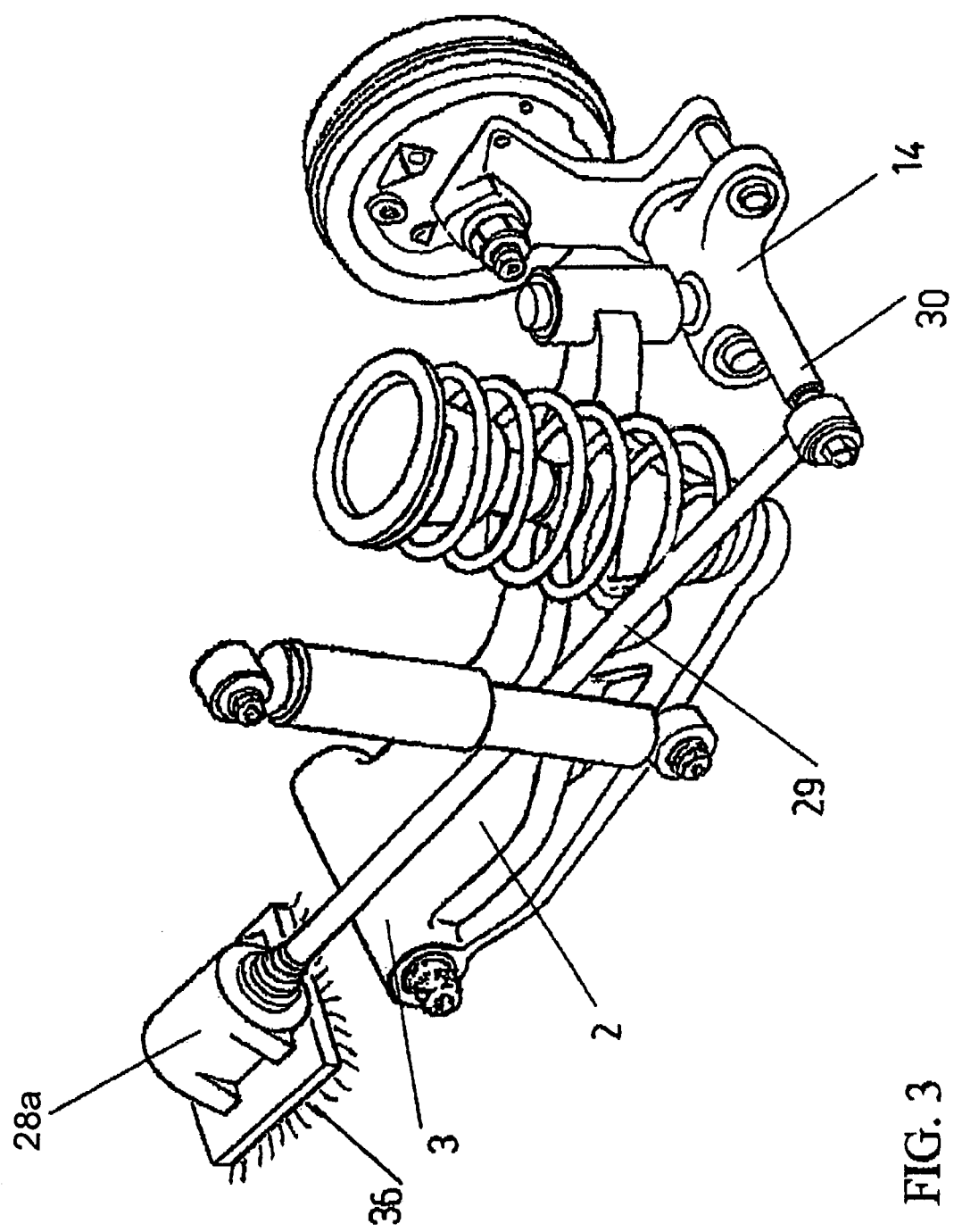
FIG. 3 is a schematic perspective view of another preferred embodiment of the device of the invention, where the steering actuator is fixed directly to the bodywork.

FIG. 3 shows another embodiment of the device according to the invention, in which the actuator 28a is fixed on the bodywork of the motor-vehicle.

It is to be understood that shape, dimensions and components of the device shown can be varied without going beyond the scope of the present invention as claimed in the appended claims.

The invention claimed is:

1. A steering device for supporting a rocking wheel-hub of a trailing-arm rear suspension of a motor vehicle in which the support for the wheel-hub comprises a connection element, rotatably connected to the body of the suspension, adapted to rotate in a plane substantially perpendicular to the ground and parallel to the longitudinal axis of the motor-vehicle, provided with an attachment for the wheel-hub and controlled by an elastic element adapted to limit the rotation, wherein the connection element rotates on an axle supported by a first seat adapted to rotate on an axle supported for rotation by a second seat connected to the end of the arm of the suspension not connected to the bodywork of the motor-vehicle, wherein both rotary movements are allowed in two planes substantially perpendicular each other; wherein the first seat is a cylindrical seat, provided with a steering lever, and is put into rotation by a tension rod connected to the first seat supporting the axle of rotation of the connection element and controlled by an actuator.

2. A device as claimed in claim 1 wherein the actuator is mounted on the bodywork of the motor-vehicle.

3. A device as claimed in claim 1 wherein the actuator is positioned on the arm of the suspension.

4. A device as claimed in claim 1 wherein the axle on which the first seat rotates is integral with said first seat and is supported at its ends by articulations comprising spherical joints.

* * * * *